United States Patent
Daniell et al.

(10) Patent No.: US 9,900,412 B2
(45) Date of Patent: *Feb. 20, 2018

(54) MOBILE TERMINAL CASE WITH DISPLACEABLE BEZEL

(71) Applicant: Tracer Imaging LLC, White Plains, NY (US)

(72) Inventors: Stephen S. Daniell, Northampton, MA (US); Steven M. Spiro, Chappaqua, NY (US); Theodore J. Bonnano, White Plains, NY (US)

(73) Assignee: TRACER IMAGING LLC, White Plains, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,135

(22) Filed: Jan. 18, 2017

(65) Prior Publication Data

US 2017/0195468 A1 Jul. 6, 2017

Related U.S. Application Data

(63) Continuation of application No. 14/307,076, filed on Jun. 17, 2014, now Pat. No. 9,565,279.

(60) Provisional application No. 61/956,837, filed on Jun. 18, 2013.

(51) Int. Cl.
*H04M 1/00* (2006.01)
*H04M 1/02* (2006.01)

(52) U.S. Cl.
CPC .................................. *H04M 1/0283* (2013.01)

(58) Field of Classification Search
CPC .................................................. H04M 1/0283
See application file for complete search history.

(56) References Cited

U.S. PATENT DOCUMENTS

| | | | |
|---|---|---|---|
| 3,838,229 A | 9/1974 | Morrell et al. | |
| 4,292,481 A | 9/1981 | Barnes et al. | |
| 5,113,435 A | 5/1992 | Chen | |
| 5,745,566 A | 4/1998 | Petrella et al. | |
| 6,374,088 B1 | 4/2002 | Gustafsson | |
| 6,980,825 B1 | 12/2005 | Andersen et al. | |
| 2008/0144265 A1* | 6/2008 | Aoki | G06F 1/1601 361/679.04 |
| 2008/0283375 A1* | 11/2008 | Iohara | H01H 13/705 200/296 |
| 2009/0059485 A1* | 3/2009 | Lynch | H01H 9/0207 361/679.01 |
| 2009/0163255 A1 | 6/2009 | Sadler | |
| 2013/0098782 A1* | 4/2013 | Diebel | A45C 11/00 206/45.25 |

FOREIGN PATENT DOCUMENTS

FR 836773 1/1939

* cited by examiner

*Primary Examiner* — Mohammed Rachedine
(74) *Attorney, Agent, or Firm* — Leason Ellis LLP

(57) ABSTRACT

A case for a mobile electronic device is configured such that it is not necessary to fully separate parts of the case in order to install, remove or replace a graphic insert. The user is only required to access an interior bay to a degree sufficient to introduce or extract a graphic insert. This access is accomplished by the limited relative displacement of two distinct structural components.

22 Claims, 4 Drawing Sheets

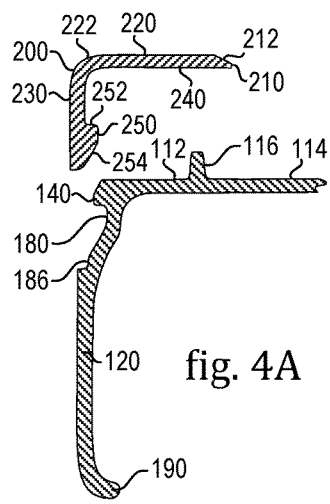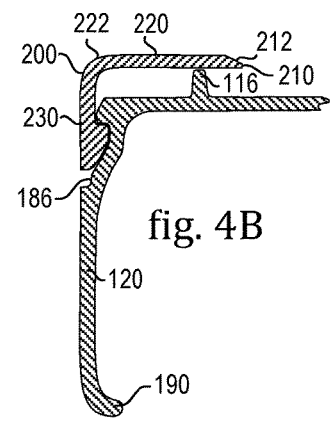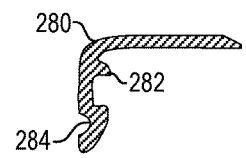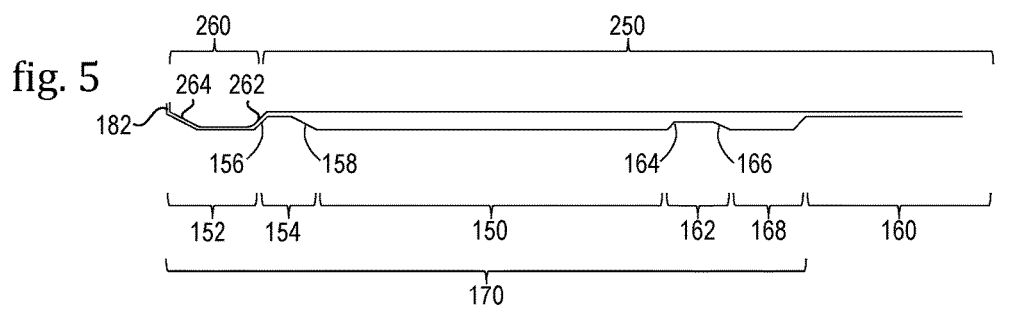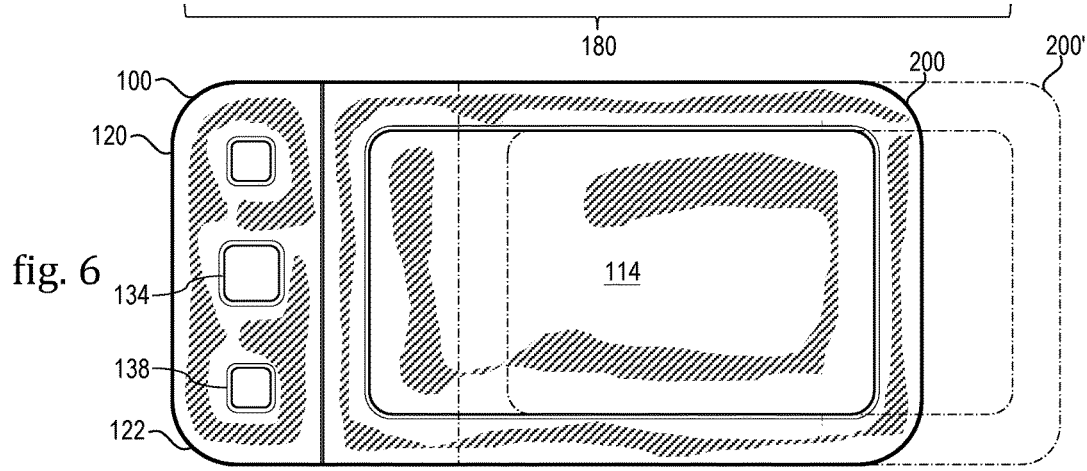

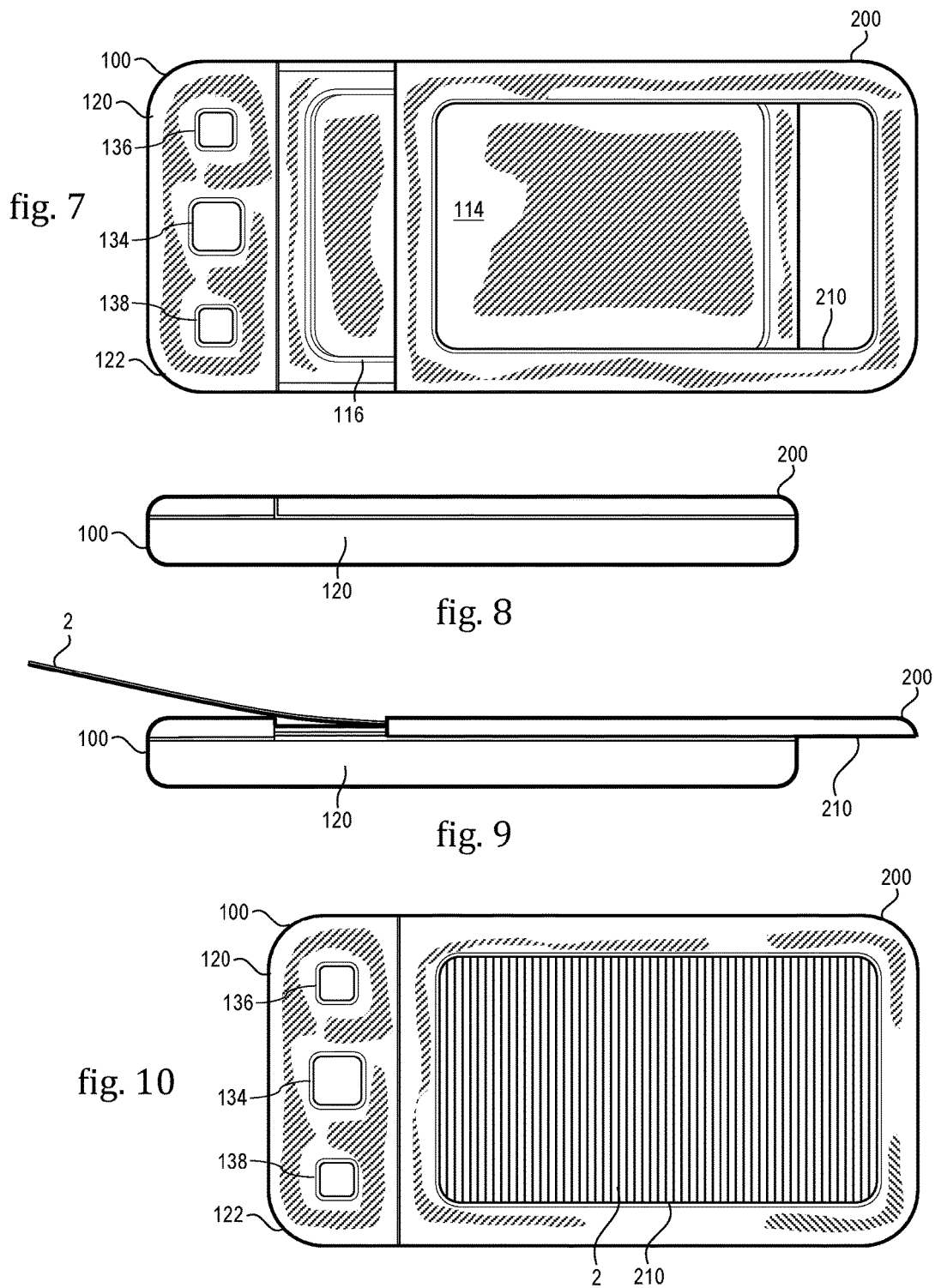

MOBILE TERMINAL CASE WITH DISPLACEABLE BEZEL

CROSS-REFERENCE TO RELATED APPLICATION

Figure 1:
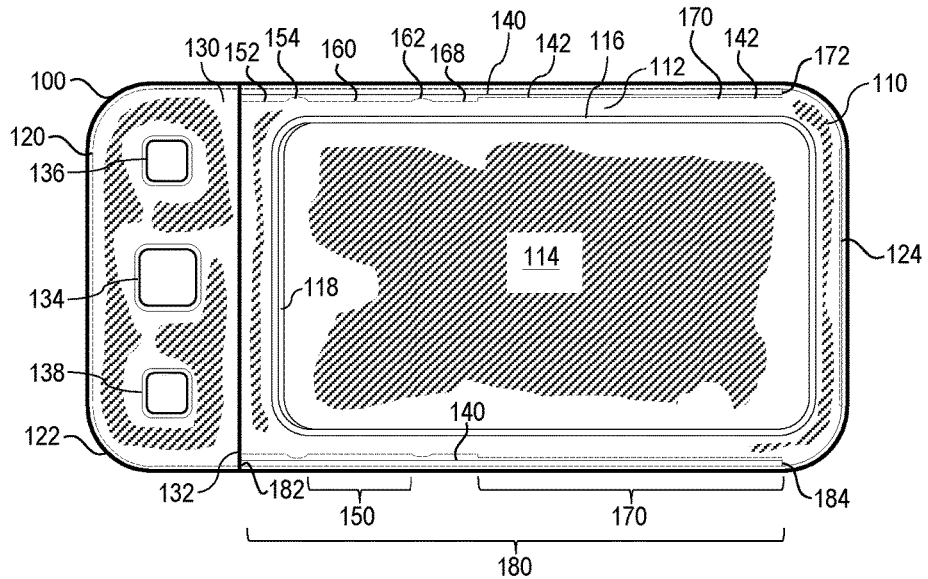

The present invention is a continuation of U.S. patent application Ser. No. 14/307,076, filed Jun. 17, 2014, which claims the benefit of U.S. patent application Ser. No. 61/956,837, filed Jun. 18, 2013, which is hereby incorporated by reference in its entirety.

TECHNICAL FIELD

The invention relates to cases for mobile electronic devices. More particularly, it relates to cases for mobile electronic devices whose appearance can be changed. Yet more particularly, the invention relates to cases whose appearance can be changed by the insertion, removal, inversion, or replacement of a discrete insert.

BACKGROUND

The design of household and mobile electronic devices has often reflected a desire to accommodate a user's desire for visual variation. This may be to distinguish the device from others of similar design, to make its appearance conform to a particular social environment, or simply to make the item more attractive or more clearly individualized.

Preprinted and customized decals are widely available for many makes of phones, as are auxiliary cases that include panels and shells that have been printed with graphics provided by the user. However, changing decals requires some skill and precision, while changing the graphics in custom-printed cases usually requires that the entire shell be repurchased with new graphics.

Accordingly, there is a desire on the part of consumers to more easily and frequently modify the appearance of their mobile devices. One traditional response to this demand has been to provide an overlay or insert which is designed be mechanically released from the device or its ancillary enclosure.

For example U.S. Pat. No. 3,838,229 describes a cover which may be wrapped over a housing to change its color. U.S. Pat. No. 4,292,481 describes an interchangeable faceplate for a telephone of plastic, natural or synthetic leather, paper, metal or fabric. The faceplate is placed under a transparent cover to allow a telephone's appearance to be altered. U.S. Pat. No. 5,745,566 describes a mobile telephone with interchangeable escutcheons so that a user may electively vary a phone's visual aspect.

The personalization of an electrical communication device with a printed image may be taken as a specific subcategory of this wider class of graphic personalization. French patent FR 836,773, published in 1939, discloses a telephone design having a dial with a locket-like picture enclosure at its center. U.S. Pat. No. 5,113,435 details a phone design in which a printed image may be inserted between a numbered transparent sheet and a soft-touch keypad. U.S. Pat. No. 6,374,088 describes a flip-type mobile phone with a transparent cover that encloses a photograph or other artwork. U.S. Pat. No. 6,980,825 describes a handset-style phone that has a removable back cover part with means for holding a picture, the picture then being visible through the installed cover. U.S. Patent Application 2009/0163255 also describes a transparent housing part for a handset that can hold a photographic image.

In general practice, it has also become widely understood that a transparent protective phone sleeve or case, or one with a suitable transparent panel, may be made to entrap and exhibit any thin printed image. It should be generally appreciated that there are many further practices associated with the personalization of mobile devices with user-provided graphics that are not enumerated here, and that such diversity described a widespread interest in customization and visual appeal in the surface design of portable electronics.

Beyond the category of surface design, personal electronic devices or their supplementary cases have also been provided with secondary pockets, compartments, covers and enclosures. In addition to battery and memory storage bays, these ancillary features may includes accommodation for mirrors, cosmetics, credit cards, business cards, coins, currency, receipts, tools, or keys.

By reference to the preceding prior art, it may be observed that these approaches generally involve the removal of a part, or partial disassembly of a device, in order to install an individuating graphic insert. In the case of unpracticed users, the separation of the parts and their necessary reassembly during installation of the graphic insert will inevitably include instances of improper or imperfect use. Particularly, the removal and refitting of relevant parts may distort or break structural connectors. An inexperienced or distracted user may drop, lose or damage loose parts. A mislocated insert may itself cause damage or be damaged owing to improper entrapment between the relevant parts.

SUMMARY

The invention describes a set of solutions for providing interchangeable graphics that ease the substitution of differing graphic inserts. In general, the invention describes an original or after-market case for a mobile electronic device in which it is not necessary to fully separate parts of the case in order to install, remove or replace a graphic insert. More specifically, the invention describes a range of designs in which the user is only required to access an interior bay to a degree sufficient to introduce or extract a graphic insert. This access is accomplished by the limited relative displacement of two distinct structural components.

Within the understanding of the invention, graphic insert may be a printed photograph or card, a lenticular print, a natural or synthetic material, and may include any sort of stock or custom graphic design. Inserts may electively be provided in sets according to any subject, topic, or theme. Inserts may also be provided so as to exhibit, on their alternate faces, differing visual or tactile qualities. To that end, imagery, textures, colors, or materials may be variously combined and interchanged with diverse rationales and circumstances in mind.

BRIEF DESCRIPTION OF THE DRAWING FIGURES

Figure 2:
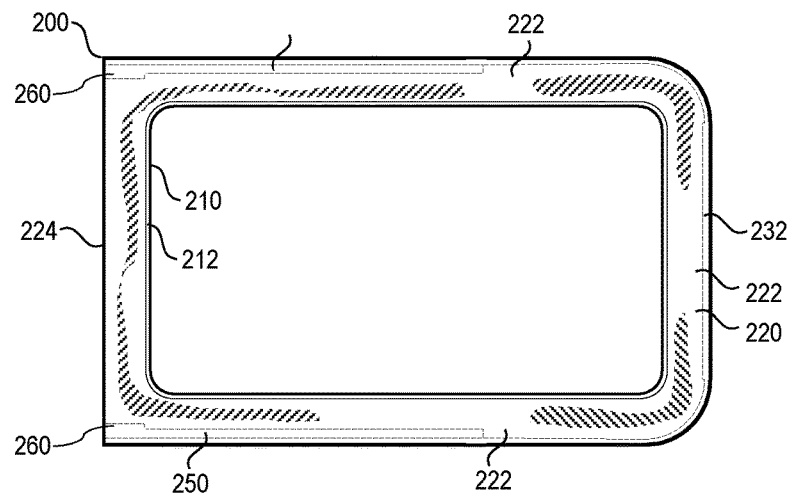
Figure 3:
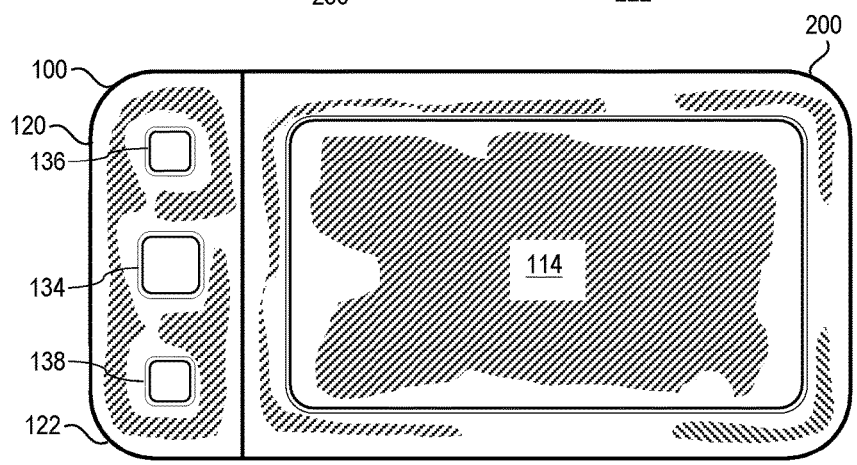
Figure 11:
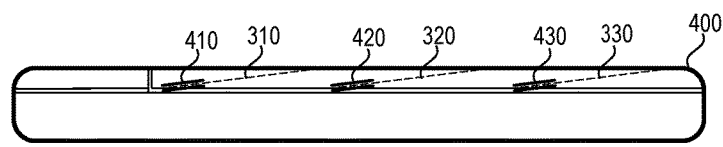
Figure 12:
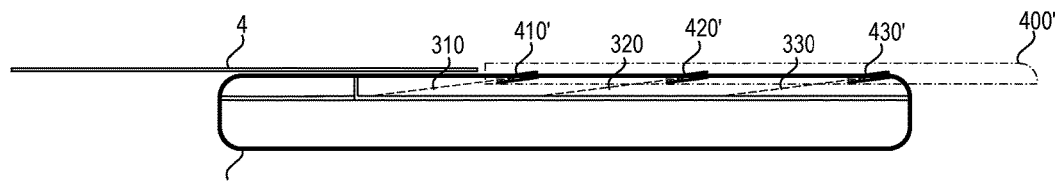
Figure 13:
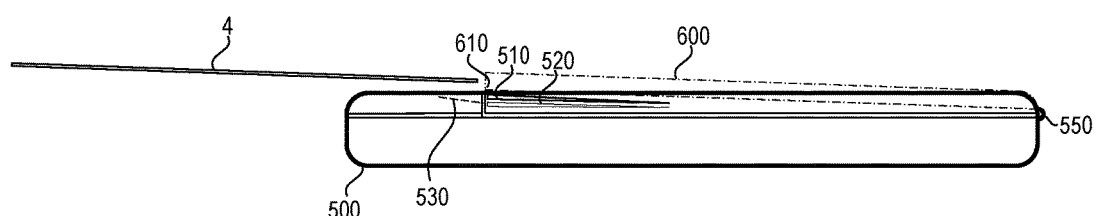
Figure 14:
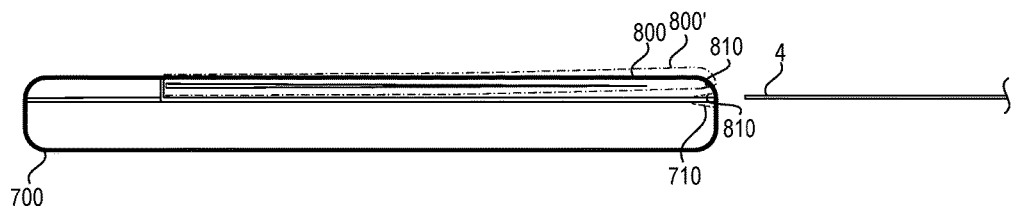

The structure and operation of these exemplary embodiments may be understood in reference to the following drawings in which:

FIG. 1 illustrates the body component in a sliding embodiment of the invention, FIG. 2 illustrates the bezel component in a sliding embodiment of the invention, FIG. 3 illustrates the assembled case in a sliding embodiment of the invention without an insert, FIG. 4A is a partial sectional view of the process of engaging of the bezel and body component, FIG. 4B is a partial sectional view of the effectively inseparable engagement of the bezel and body components, FIG. 4C is a partial sectional view of an alternate bezel profile, FIG. 5 illustrates a schematic detail of the sliding feature and catch structure, FIG. 6 illustrates a closed case in sliding embodiment of the invention, alternately indicating its open position, FIG. 7 illustrates a sliding embodiment of the invention showing the components in their alternate open relationship, FIG. 8 shows a side view of the case in its closed position, FIG. 9 shows a side view of the case in its open position, with an insert flexed for installation, FIG. 10 illustrates a closed assembled case a sliding embodiment of the invention in a closed position, with an insert installed, FIG. 11 illustrates a side view of a diagonally shifting embodiment of the invention in a closed position, FIG. 12 illustrates a side view of a diagonally shifting embodiment of the invention indicating an open position, FIG. 13 illustrates a side view of a tilting embodiment of the invention in a closed position, indicating the location of the alternate tilted open position, and FIG. 14 illustrates a deflecting embodiment of the invention in a closed position, indicating how the bezel deflects into an open position during installation of an insert.

DETAILED DESCRIPTION OF CERTAIN EMBODIMENTS

In the mobile terminal cases described within this specification, access is to an interior bay suitable for the retention of a graphic insert is accomplished by the relative displacement of two distinct structural components. In the recited exemplary embodiments of the invention, the mobile terminal case operates by allowing a restricted degree relative motion between two interconnected but functionally discrete components. These two components may be formed, assembled, and manipulated in a condition of complete physical discontinuity. However, in some cases the components may electively and expressly be made to remain connected, for example, by a live hinge, molded thread, or other practicable pliable feature.

Indeed, it should be generally appreciated that, in the included explanations of the invention, the idea of separate components refers to the parts' functionality as independently manipulable elements that defines their discreteness or separateness, rather than their absolute physical separability. Furthermore, in addition to the structurally functional pliable modes of attachment previously described, components herein characterized as discrete or separate may as a matter of course be connected by sacrificial appurtenances such as sprues, runners, vents and flashing at any stage of their manufacture.

In the embodiments described, the components between which the relative motion is imparted are designed so that they may amenably be injection-molded in one or more thermoplastic polymers. However, it is not the intent of the invention that it be limited to such means and materials. Examples of other methods include: fabrication of metals, alloys, resins, or natural materials, the casting of metal, resin, or silicone, or the fashioning of solid structures by accumulative means such as those used in the direct material fabricators commonly known as 3D printers.

The invention comprehends but is not restricted to cases structured and dimensioned for the categories of personal electronic devices commonly known as mobile phones, smart phones, personal digital assistants, tablet computers, laptop computers, handheld computers, and digital calculators. The structures of the invention may be integrated into the design original mobile terminal housing, hereinafter termed an inceptive case. The invention may also be applied to a secondary or supplementary housing, hereinafter termed an auxiliary case.

An inceptive case is commonly devised with some protective and cosmetic qualities, and therefore might foreseeably be outfitted with an insert retention system formed in accordance with the invention. However, the functional exterior structure of an inceptive case is often devoted to bays for batteries or data cards. Therefore, in practice, auxiliary cases generally offer more occasion for individuality, versatility and flexibility than an inceptive case. The invention is therefore anticipated to be more routinely devised as a feature of an auxiliary case.

For clarity of description and illustration, therefore, the exemplary embodiments are represented as auxiliary cases. However, it should be recognized that the signature attributes that constitute the novel aspects present invention may equally be integrated into the design of an inceptive case, and that this alternate arrangement is implied in all instances herein described.

Auxiliary cases are usually purchased to fit a particular model of mobile device, and often offer both a protective and a cosmetic function. Auxiliary cases commonly conformally surround a preponderance of the mobile device's flush surfaces. Often the display surfaces are left exposed; however, when functionally appropriate, it is also not unusual for display surfaces to be covered with a transparent shield or window.

In the invention, the case includes a body component and a bezel component. The body component at least partially surrounds the volume enclosing the electronics of the mobile terminal. The body component may provide electrical insulation, dustproofing, waterproofing, scratchproofing, shock absorption, or decoration.

A bezel component provides a visual port through which an image, design, or material may be viewed. The two components are mechanically connected so that a degree of relative movement may be imparted.

More specifically, the two assembled components may be placed in relative motion from a first position to a second position, while being retained throughout in an interconnected relationship. An additional aspect of certain embodiments of the invention is that, for ease of use and the convenience of the user, catches may be provided at either or both end of the path of relative travel. The catches hold the two components in a stable relationship in its open state and its closed state. In this way, unexpected relative travel is discouraged.

The visual port may be a physical opening in an opaque bezel, in which case the bezel and insert would typically be expressly devised to be of compatible dimensions so that the edges of the opening overlays the anticipated insert in a manner sufficient to prevent the accidental escape. The bezel may alternately be made of more than one part, in which case the visual port may be an opening that is fractionally distributed over a plurality of molded elements. The visual port may also be a transparent window.

Such a transparent window may be made of a polymer such as polymethylmethacrylate (acrylic, PMMA), polystyrene (styrene, PS), or polycarbonate (PC). It may also be made of or include thin, shatterproof glass such as that used in the manufacture of robust LCD displays. The transparency of the material may be pervasive quality of the bevel component. A partially or wholly opacifying surround may be painted or applied to perimeter regions of a transparent bezel part in order to attractively retain or disguise the edges of the insert.

Alternately, a window may be separately formed and joined to a surrounding bezel element. The window may be retained by entrapment between two bezel subcomponents, within grooves, by adhesive, by independent hardware, or by integral retaining features on the relevant part or parts, such as protrusive clips.

The invention may be realized in a variety of ways. In each of the following embodiments, two functionally discrete components are assembled and then spatially displaced by the user so that an insert may be inserted, removed, or interchanged. While for simplicity this specification concentrates on the case where there are only two major components, it may be appreciated that each of these components may be a subassembly. Also, there may be additional functional features, such those enumerated in the previous general discussions, combined with the invention.

It should be noted that the design of protrusive molded connectors such as snaps, clips, guides, or pins often allows a designer control of the degree of separability. Members of a subset of this class of connection features are sometimes referred to as molded spring clips or snap fittings. These fittings characteristically include at least one hook-like sectional profile which has specified entrance and retraction angles. Depending on the application, a snap fitting can mate with another snap fitting, or with a dissimilar mating or receiving feature such as a hole, recess, detent, catch, pin, post or rib.

Snap fittings can be engineered so that both the fitting and its receiving counterpart deflect, or so that only one component deflects while the other acts as a rigid lug. Deflection-strain analysis of a proposed hooked feature typically delivers optimal designs having tapered sectional profiles. The optimized taper typically narrows toward the hooked end, and can be symmetrical or asymmetrical, depending on other design parameters.

A suitable distribution of flexural strain can be attained by a section having a taper in one axis, in two axes, or in conic form. In mathematical terms these volumes are frusta: respectively, a frustum of a wedge, a frustum of a pyramid, and a frustum of a cone. In a molded part, this volume is common geometrically blended through radii or fillets. This practice reinforces the juncture of the fitting to a larger molded body, and eases release from the mold cavity. These and other technical proficiencies are understood, and may be incorporated into the diversity of designs that might be formed in accordance with the invention.

Of particular relevance to the invention is the formation of face angles. A typical snap fitting includes a hook-like profile with specified entrance and retraction angles. Face angles on snap fittings influence the ease of assembly and subsequent degree of separability.

For example, a snap fitting having a 90° retraction face angle may be disposed to engage with a mating feature so that the parts are inseparable without distortion or breakage. In contrast, a snap fitting designed to be separable typically have a retraction face angle of 45° or less. A retraction face angle of 60°-90° is generally taken as the geometric limit where fittings may be considered to be effectively inseparable, while the range of 0°-60° provides practical separability [Bayer Materials Science; Snap-fit Joints For Plastics, p. 20].

The retraction face angular value is typically carried out on both the snap fitting and its mating feature. In this case, when a separating force is imparted, the mating features ramp against one another until the snap fitting bypasses its cooperating feature, at which points the joint is mechanically released.

Similarly, the entrance angle affects the force necessary to assemble the parts. Since ease of assembly is a common design goal, entrance faces typically have a relatively shallow slope. Entrance angles of 15° to 30° are typical where permissible. In theory, any angle less than 90° can be used as an entrance angle. However, in practice, plastic deformation, impractically high requisite insertion forces, and breakage generally discourage entrance angles exceeding 45°.

It should be noted that the retraction angle does not in itself define whether or not a snap fitting is separable. A snap joint having 90° mating faces may be separable if means are provided for active deflection. Active deflection may be provided for by the allowance of direct deflection of the hooked feature. It may also be permitted via a release button or thumb tab. Disassembly is often less conspicuously allowed by a hole or slot for a tool, such as a pin or screwdriver. The call for of the use of a tool of a particular dimension is a commonly used tactic to discourage separation by inexpert users, while still permitting professional disassembly for repair or maintenance. To that end, such features may be covertly located in a channel or seam. Such variations are foreseen within the invention.

In the design and fabrication of snap fitting, there are considerations apart from the mechanical functionality of the joint that affect the comprehensive utility of a given design. First, snap fittings often include pins or ribs that stand off from the larger surface from which they protrude. However, in injection-molded parts, if the volume of the protrusion is too large, sinking will occur on the opposite face, creating a depression. This effect is primarily a concern when the sinking occurs on a visible surface. The sinking then visibly mars the part's geometric continuity.

To completely avoid visible sinking, it commonly recommended that any abrupt protrusion should have no more than one-third of the sectional thickness of the wall from which it protrudes. It may be appreciated that it is difficult to design a snap fitting that conforms to these conditions when a thin-walled part is desired. According to this formula, a protruding fitting having a 1 mm section would have to be borne on a 4 mm wall; conversely, a 1 mm wall would allow a protruding fitting having a sectional dimension of only 0.25 mm. The recommended wall thicknesses for the economical molding of common polymers such as ABS and polycarbonate is typically limited to the range of 0.6 mm to 3 mm. Without further accommodation, it may be appreciated that both of the forgoing results would be unsatisfactory in the forming of durable, lightweight, cost-effective parts for mobile electronics housings and accessories.

A further consideration in the design of molded connectors is the structure and operation of the mold itself. Connectors such as snap fitting often include undercuts. Some minor undercuts can be allowed given a suitably forceful ejection routine. More significant undercuts can sometimes be integrated in a two-part mold operation through the use of sliding shutoffs, which in effect conscientiously distributes the parting plane over disparate planes or surfaces.

However, the through-holes left by this process are not acceptable for many structural situations.

Neither are such surface irregularities normally tolerated in visible parts. Parts combining high structural integrity or cosmetic appeal with undercut features therefore often require mold elements the are placed in relative motion in order to successfully eject the part. Such elements include sliding cores, side-action cams, and lifts. Such features may be variously implemented, and the acceptable complexity can be highly dependent on factors such as the size of the anticipated run of parts, the requisite mold maintenance, or its base material and projected lifetime.

Rigid injection-molded parts typically require a minimum draft angle of 0.5°. However, a 0° or even negative draft angle is possible in elastomeric parts, or in parts molded in a multi-shot operation that include an elastomeric material at relevant locations. Such variations are anticipated in the invention, and any description or depiction of a common practice in this specification should not be construed as an intention to exclude atypical implementations.

The following four exemplary embodiments have the common property that in each instance the case is devised so that two components are retained in a mutually engaged relationship in such a fashion that they may be, at least in part, temporarily displaced relative to one another to a degree sufficient to allow the introduction of an insert into a secure position within an internal bay defined by the conjunction of the two joined parts. In each instance, as the insert in placed, the components are moved from a closed state to an open state to receive the insert, and then return to the closed state to secure the insert.

In one embodiment, a case for an electronic device includes two components, one being a body component and the other being a bezel component, and at least one of the components includes a snap fitting such that when engaged with its cooperating component, a degree of relative play is nevertheless permitted in one axis such that the components may be made to slide linearly from one relative location to a second.

In another embodiment, a case for an electronic device includes two components, one being a body component and the other being a bezel component, and at least one of the components includes a snap fitting such that when engaged with its cooperating component, a degree of relative play is nevertheless permitted in one axis such that the components may be diagonally elevated from one relative location to a second.

In a further embodiment, a case for an electronic device includes two components, one being a body component and the other being a bezel component, and at least one of the components includes a snap fitting such that when engaged with its cooperating component, a degree of relative rotational play is nevertheless permitted such that the components may be rotated from one relative position to a second.

In an additional embodiment, a case for an electronic device includes two components, one being a body component and the other being a bezel component, and at least one of the components includes a snap fitting such that when engaged with its cooperating component, a degree of relative deflective play is nevertheless permitted in one axis such that the components may deflected from one relative position to a second.

In the first example above, the sliding motion partially exposes the bay so that an insert may be introduced into it. Because the bay typically includes a recess to securely hold the insert, a limited degree of deflection of the insert is required in order for the insert to bypass the outer surface of the case. The case can readily be devised to allow insertion from either end. Once the insert is properly located in the bay, the components can again be placed in a closed relationship.

In the second example above, the diagonal relative motion allows an introductory opening to be established at a plane that differs from the plane of the recess that the insert will eventually occupy. Once the case is open, the insert may be directed into this opening and properly located in the bay. The components can again be placed in a closed relationship, entrapping the insert. Because this configuration does not require any flexure of the insert, the arrangement can permit the introduction of fragile or inflexible materials, such as sheets of glass, bone, shell, or metal.

In the third example, the rotational relative motion between the body component and the bezel component is sufficient to allow the introduction of an insert. A live hinge is one in which the two components are connected along an edge by one or more narrow membranes of plastic. The lifetime of this type of hinge depends not only on the number of times it is extended, but on the angular range of its extension as well. In this embodiment, the angular extension would optimally be limited a few degrees. In this manner, sufficient access would be gained to the bay to install the insert, without inducing unnecessary fatigue in the membrane hinge. This embodiment would also permit the introduction of rigid inserts.

In the fourth example, the relative deflective motion between the body component and the bezel component allows the introduction of an insert. In effect the two components are inseparably joined, but in such a way the force applied by the edge of an insert at a joint between the two components permits a degree of relative deflection or deformation such that the insert can be introduced into the bay. Once properly located, the components return to their closed state, entrapping the insert.

In all four embodiments, it is intended within the invention, without it being an absolute limitation of the invention, that the two components be effectively inseparable in normal use. It is further envisioned that in many cases the snap fittings may be used to inseparably join the parts, while also mating with secondary relief features that serve as locators for the components' open and closed states.

FIG. 1 depicts the body component. FIG. 2 depicts the bezel component. FIGS. 3 through 10 illustrate various aspects of the featured embodiment of the invention while in its assembled state. Returning now to FIG. 1, Sliding bezel case 10 includes a first component in the form of sliding case body 100. The case body may amenably be formed by thermoplastic injection molding.

Methods are known by which differing mold cavities may be exchanged during the molding operation, without removing the part, so that a secondary material may be thermoplastically bonded to the element resulting from first molding phase. This process is known as two-shot, multi-shot molding, or co-injection molding.

In the instance of a case for a mobile electronic device, this process may be used, for example, to line a relatively hard exterior shell with a more resilient polymer such as a thermoplastic elastomer. It may also be used to provide elastomeric cover for buttons, for example, on the side of the device.

The design of a given shell may accord with the layout of features included in the original device. For example, the case may include ports for power buttons, camera controls, power cords, battery chargers, data cards, external antennas, headphones, data cards, data cords, dictation, hands-free telephone dialing, menu selection, lights, projectors, speakers, microphones, or whatever other functions are intrinsically provided in the device.

Sliding case body 100 includes a number of distinct features. In the illustrated embodiment, the exterior of sliding case body 100 includes a substantially planar sliding case body back 110. Sliding case body bay floor 114 occupies a central region of sliding case body 100 and connects to sliding case body bay wall 116. While the bay wall rises in an essentially perpendicular direction from body back 110, it should nevertheless be appreciated that such radii or fillets are commonly specified. This specification may be to conform to a minimum practical tool radius, to ease unmolding, or to ensure part fit and consistency over the life of the mold.

Toward to edge of the case body bay wall 116 joins, by such radii, sliding case body back outer plane 112 and insert bay floor 114. Removal assist bevel 118 provides a gradual ramp between insert bay floor 114 and the apex of bay wall 116. In the illustrated embodiment, the outer plane is shown as coplanar with the bay floor; however, it may be appreciated that this need not be the case. Furthermore, the outer plane area may include functional relief features, such as latching features of the sort that will be subsequently described in more detail.

Sliding case body sidewall 120 departs from the plane such that its defining surfaces are essentially perpendicular sliding case body back 110. The sidewalls are joined by sliding case body corner radii 122, according, generally, to the shape of the anticipated device. Alignment slot 124 is recessed in one end of the body component. Sliding case body back includes raised surface 130. Raised surface is partially defined by edge step 132. Features within raised surface 130 cooperating with elements existing in the anticipated electronic device include sliding case body camera aperture 134, sliding case body viewfinder aperture 136, and sliding case body flash aperture 138.

Elongate features in this embodiment of the invention enable a sliding action parallel the long central axis of the device. Sliding case body rail 140 protrudes along a portion of the body component. The rail section on the body component may extend for about 75% of the length of the device, but is variable within the invention.

Sliding case body rail trough 180 parallels body rail 140. Sliding case body rail trough 180 is devised with expressly formed surface discontinuities to provide a holding function in compatible operation with compatible mating features on the bezel component. It should be noted that it is understood that these features may be integrated in alternate locations on the body component. Furthermore, in general, where a function is dependent on a snapping or sliding function, it is understood that the specific structures relating to these functions may often be reversed without altering their effective performance.

FIGS. 1, FIG. 4A, FIG. 4B, and FIG. 5, show various drawings describing of the workings of body rail trough 180 and its associated catch mechanisms. Sliding case body catch track 170 includes the section of rail trough 180 associated with two positional locators.

Two elongate sections of linear track within the length of rail trough 180 are indicated in FIG. 1 and FIG. 5. Sliding case body catch intermediate track 150 lies between two catch positions at either end of sliding case body catch track 170. Sliding case body linear guide track 160 extends in the same direction beyond the region where the catch mechanisms are located. Guide track 160 is limited at its distal end by molded stop 184.

Sliding case body hard catch recess 152 is shown here as a hollow, but may amenably be a hole as well. Sliding case body soft catch boss 162 protrudes from case body catch track 170, however, soft catch boss 162 protrudes less prominently case body catch track 170 than hard catch boss 154. Sliding case body soft catch boss 162 includes soft catch boss retraction face 164 and soft catch boss closure face 166 in a manner analogous the faces of the more prominent boss.

In the depicted embodiment, sliding case body soft catch recess 168 is a recess, but may also amenably be a hole. It may be seen that in the illustrated version of the invention, the hard catch recess 152, intermediate track 150, and soft catch recess 168 all include a face occupying a common geometrical plane. Guide track section 160 is devised to remain engaged with the compatible bezel component throughout the length of its travel.

Additional features of the body component include sliding case body reveal 186. The reveal may be prospectively dimensioned to generate a channel in the assembled case. The reveal may be a channel, raised edge, molding, or bead. To hold the electronic device reliably within the body component, sliding case device retention trim 190 may be formed either continuously or discontinuously about the face-side rim of the case.

In this embodiment, the second component is represented by sliding case bezel 200. Sliding case bezel 200 here forms a continuous frame around sliding case bezel port 210, which defines a rectangular opening through the bezel. Sliding case bezel port bevel 212 is formed on the interior edge of the bezel port. A suitable proportion for such an opening is an aspect ratio of 16:9 or 9:16, as this corresponds to high definition image standards, and accords with the proportions of the displays in many portable devices. While no transparent window is depicted, this or any other embodiment of this invention may be modified to include a flush or recessed window with the port.

Sliding case bezel exterior surface 220 is has radiused surfaces 222 on three of its sides that join with bezel walls 230, while its fourth edge 224 prospectively forms a joint with a geometrically contiguous raised surface 130 upon sliding case body 100. Alignment tab 232 extends slightly inward toward the port. Sliding case bezel interior surface 240 includes engagement features devised to mate with compatible features on sliding case body 100.

A first set of relief features is associated with the effectively inseparable assembly of the components. Sliding case bezel primary rails 250 include insertion faces 252 and fixture faces 254, as shown in FIG. 4A. Linear positional stops include sliding case bezel catch tab 260, which includes sliding case bezel tab retraction face 262 and sliding case bezel tab closure face 264.

The two components are assembled into a single functional device by applying force between them. It is an aspect of the invention that it can be joined in such as way that the two major components, once joined, may not be readily or accidentally parted from one another. However, while joined, the parts may nevertheless still be put in relative motion so that access to the bay is obtained.

To assemble the two parts, the components are placed in aligned contact as if in a fully extended state. In this embodiment, the tracks would typically be designed to allow an extension equal to between 20% and 40% of the full length of the sliding track. An excessive extension makes the operation of opening and closing prone to racking and jamming, while too little extension demands a greater degree of flexure in the insert.

It should be noted that the distance between the soft or open latch position and hard or closed latch position, relative to the entire track length, substantially accords with the degree of extension. Locating the components in an extended position allows the maximum amount of deflection in the bezel walls, ensuring the secure mating of the cooperative tracks without breakage. To join the parts, an assembling force is applied between them. As force is imparted, the angled face of sliding case bezel primary rail 250 contacts and rides over the surface of sliding case body rail 140 and engages in sliding case body rail trough 180.

The act of assembly may be most directly appreciated by reference to FIGS. 4A and 4B. FIG. 4A is a partial sectional view of the process of engaging of the bezel component and body component. FIG. 4B is a partial sectional view of the effectively inseparable engagement of the bezel and body components. It may also be seen that the bezel component overhangs bay wall 116 in such a way that the edges of an insert may be concealed.

FIG. 4C is a partial sectional view of an alternate bezel profile 280. The alternate bezel profile includes secondary rail 282, which provides additional alignment of the two components, and linear indent 284, which can be used to reduce material use and diminish the risk of visible sinking in the visible exterior of the case. These variations are shown as typical of departures from the preceding embodiment which can be included within the invention in pursuit of specific design goals.

Making particular reference to the diagram of FIG. 5, sliding case body hard catch boss 154 includes hard catch boss retraction face 156 and hard catch boss closure face. The two components now engaged are nevertheless free to move over a certain degree of linear travel. In the fully closed state, bezel catch tab 260 is secured in hard catch recess 152 and prevented from moving by hard catch boss 154. As sliding force is applied by a user to open the bay, retraction face 262 on bezel catch tab 260 and hard catch boss retraction face 156 bear against one another until the tab bypasses the boss on the body component, allowing sliding to occur. FIG. 6 illustrates a closed case in sliding embodiment of the invention, indicating its open position 200' at the unevenly broken outline. FIG. 7 illustrates a sliding embodiment of the invention showing the components in their alternate open relationship.

In the general operation of the invention, sliding may now occur freely until bezel catch tab 260 encounters soft catch boss 162 protruding from catch track 170. As soft catch boss 162 protrudes less prominently from sliding case linear track 170 than hard catch boss 164, the user may easily advance the sliding action past the meeting of bezel catch tab 260 and soft catch boss retraction face 164. Once bezel catch tab 260 is engaged in soft catch recess 168, the bezel is held in an open position. The soft open position retains the bezel component in a stable relationship with the body component so that, for example, an unexpected loose motion of the parts does not cause the user to drop the insert or the electronic device.

FIG. 8 shows a side view of the case in its closed position. Referring to FIGS. 9 and 10 in the drawings, insert 2 is selected for installation into a case formed according to the invention. It may be appreciated that the insert may vary in its physical properties depending on the requirements of a particular embodiment, or to be commensurate with a given design.

When the case is open, insert 2 may be placed into the bay. FIG. 9 depicts the flexion of insert 2 during the installation process. As noted previously, a slight flexure of the insert is necessary to introduce it into the open bay. In the case of a mobile phone case, the insert may be around 100 mm in length. A 16:9 aspect ratio implies a 100 mm×56.25 mm insert dimension. It is only necessary to flex the insert enough to bypass the exterior shell of the body component. In the instance where the sliding bezel component allows a 25 mm opening, and the bezel wall thickness is around 1 mm, it may be appreciated that the insert need only be conformed to an arc whose length is 25 times its chord. FIG. 10 shows an insert installed in the bay, with the cover returned to a closed position.

Diverse materials of varying flexibility or rigidity may therefore be inserted, including relatively rigid ornamental materials such as finished woods, embossed metals, or colored polymer or resin laminates. While paper or cardboard graphics may be used in the bay, it is foreseen in the invention that graphic substrates and printing techniques that provide an innate degree of protection will have a particular compatibility with the invention.

Examples of such materials include lenticular prints, graphics reverse-printed on transparent media, or graphics printed by dye-sublimation on opaque stock such as white plastic. As implied above, the insert need not be simply planar, but may have raised or textured patterns, and still be able to be inserted in the bay.

As suggested earlier, the insert may be reversible. For example, the insert may have a more formal wood or metal laminate face suitable for a business environment, while the reverse of the insert may be furnished with a more vibrant surface design, or printed with personal photographs. In the invention, a case devised according to these conditions may be opened and the insert flipped in a matter of seconds, without either removing the electronic device or disassembling the major case components.

To close the bay, sliding case body 100 and sliding case bezel 200 are disengaged from the soft catch relationship by moving the components manually against one another. This may be achieved, for example, by pushing the relevant ends of the components in a linear motion. Since the snap fitting between the rails is devised to make the two major components relatively inseparable, and since the proportion of the rails that remains engaged at all times is relatively long, smooth, linear travel of the two components is ensured.

In this closing operation, bezel tab closure face 264 meets soft catch boss closure face 166 and ramps over its relatively slight protrusion. Bezel tab closure face 264 then rides along intermediate linear track 150. Bezel tab closure face 264 on bezel catch tab 260 then meets and bypasses hard catch boss closure face 158. Bezel catch tab 260 enters hard catch recess 152, where it is securely retained until actively displaced.

While it should be understood that while a closure could be attained were these features imparted to only one side of the device, it may be appreciated that a symmetry of forces results in the smoother and more consistent operation of the invention. Therefore it is expected that in a common expression of the invention, both tracks be provided with closure features arranged in a bilaterally symmetrical manner.

Furthermore, the tabs, bosses, and recesses may be given various locations, provided that they do not wholly obstruct the relative travel of the parts. In general the features must merely be disposed at appropriate locations along the path of movement allowed between the conjoined components.

Given the foregoing discussion, it may be appreciated that various additional means may be applied to extend the design of the preceding discussion. For example, surface features such as reveals, beads or rabbets may be introduced to mask sink lines. Surface recesses may be provided, for example, in the bezel component, so that a temporary or permanent trim piece may be adhered within the recess to provide an ornamental veneer of metal or wood, while remaining flush with or recessed from the surrounding exposed surfaces of the component.

MODIFICATIONS OF THE INVENTION

The principles of the invention may be applied more broadly than in the main description above. Three additional embodiments may further define the invention.

In one previously example mentioned above, the diagonal relative motion allows an introductory opening to be established at a plane that differs from the plane of the recess that the insert will eventually occupy. The bezel, which acts as a frame or cover that holds the insert in place, is devised so that the force relayed in the action of drawing the components in relative linear motion also imparts an elevating force, so that the bezel is lifted slightly away from the body component.

Referring now to the drawing, elevating bezel component may be understood as an inclined version of the linear system described in detail in the previous embodiment. However, in this case the tracks are angled relative to the central plane of the enclosure. As the case components are withdrawn from one another, the bezel component is guided by the inclined track structure, and both slides and lifts.

Referring now to the FIG. 11, elevating body component 300 and elevating bezel components are mutually engaged so that they are difficult to separate, but so that a degree of play may be imparted. While the lifting might in theory be obtained by a single track, a more compact design may be obtained by fragmenting the inclined tracks.

In FIG. 11 it may be understood how diagonal tracks 310, 320, and 330 serve as guides for diagonal compatible shuttles located on elevating bezel component 400. Diagonal shuttles 410, 420, and 430 can engage inseparably in diagonal tracks, 310 320, and 330 in lifting body component 200, while still allowing travel along an elevating diagonal path. The shuttles are short relative to the guides, so a substantial degree of motion is allowed, as in the previous embodiment.

FIG. 12 illustrates a diagonally shifting embodiment, with an indication of an open position at 400'. The diagonal shuttles are relocated to positions 410', 420', and 430'. In operation, the components may be drawn apart to the same degree as those shown in FIGS. 1 through 4, however, in this embodiment, the bezel is lifted slightly to allow the direct linear installation of flat insert 4.

Many variations of this approach are possible. For example, as each track may include a set of stops, a track divided into three sections may electively include one to three sets of stops.

In the next embodiment, described in FIG. 13, the rotational relative motion between tilting body component 500 and the tilting bezel component 600 allows the introduction of insert 4. FIG. 13 shows a tilting embodiment of the invention in a closed position, with the alternate open position indicated by the unevenly broken line.

As in prior embodiments, the two components are inseparably engaged in a manner such that a limited degree of angular motion is permitted about the hinge line.

Hinge 550, which may be a live hinge, connects the two components along an edge.

Tilting bezel catch 610 is inseparably engaged with inseparable body lip 510 to make an effectively permanent assembly of the two components, while allowing a limited degree of angular motion. Separable body snap catch 520 separates the positions, and is geometrically devised to hold bezel component 500 in one of two positions.

In the open position, the bezel is tilted at a slight angle, typically between 1° and 5°, and most typically between 2° and 3°, so that an opening is created for the installation of an insert, as shown in FIG. 13. In the illustrated example, finger recess 530 allows the bay to be easily accessed, although this feature may be replaced by a release button, by raised tabs, by reeding or knurling on the sides of the bezel, or other assisting feature.

In an additional example, the relative deflective motion between the body component and the bezel component allows the introduction of an insert. In effect the two components are inseparably joined, but in such a way the force applied by the edge of an insert at a joint between the two components permits a degree of relative deflection or deformation such that the insert can be introduced into the bay. Once properly located, the components independently return to their closed state, entrapping the insert.

Deflecting case body 700 and deflecting case bezel 800 are effectively inseparably engaged. The engagement is made in such a way that neither linear nor rotational motion is permitted. However, the engagement is not made throughout the full length of the device, so that over a fraction of the length the parts are invisibly cantilevered.

Body side beveled leading edge 710 and bezel side beveled leading edge 810 act to translate the insertion force of insert into a parting force. As the insert is brought against the conjoined leading edges, the components are flexed apart so that deflecting case bezel 800 relocates to position 800', and leading edge 810 to 810'. Once the insert is installed in the bay, the components return to their relaxed state, entrapping the insert. As the embodiment is provided with body ramp 720 and bezel ramp 820 along the relevant edge of the bay perimeter, the insert may be removed by light directional pressure.

The preceding examples are provided only as illustration, and the full breadth of the invention should be determined according to the expressed reach of the specification and by the appended claims, in which:

What is claimed is:

1. A case for a mobile terminal comprising:
   at least two functionally discrete components;
   at least one body component having a back section and a wall section, said wall section extending in a discontinuous direction from at least one edge of said back section, said body component being configured to at least partially surround a volume enclosing electronics of said mobile terminal; and
   at least one bezel component, said bezel component having a visual port through which an anticipated insert may be viewed, said body and bezel components each including mating features such that the body and bezel components can be mutually engaged, the mating features being formed and the mutual engagement being performed so that a degree of spatial displacement sufficient to introduce said anticipated insert is permitted between said body component and said bezel component by permitting the bezel to slidingly travel across said body component while the body component and the bezel component are retained in a mated relationship so as position said bezel in an open position for allowing insertion of said anticipated insert while said bezel remains mated to the body component.

2. The case of claim 1 in which said case is an auxiliary case.

3. The case of claim 1 in which said mobile terminal is a mobile telephone.

4. The case of claim 1 in which the mated relationship is effectively inseparable.

5. The case of claim 1 in which said spatial displacement is linear.

6. The case of claim 5 in which the linear spatial displacement is parallel to a primary plane of said back section.

7. The case of claim 5 in which the linear spatial displacement is structurally limited at both ends.

8. The case of claim 5 in which said spatial displacement is linear and structurally limited at at least one end.

9. The case of claim 1 in which said case includes retention features sufficient to hold said body and bezel components at at least one terminus of their relative spatial displacement.

10. The case of claim 9 in which said retention feature relies on a cooperative effect of geometrical features on said body and bezel components.

11. The case of claim 10 in which said retention feature includes a raised boss.

12. The case of claim 11 in which said retention feature additionally includes a recess capable of being cooperatively engaged with said raised boss.

13. The case of claim 1 in which said visual port in said bezel component is an opening in a surrounding bezel.

14. The case of claim 13 in which the said opening has a rectangular shape.

15. The case of claim 1 in which said bezel component in one available position of travel relative to said body component overlays at least one edge of said insert.

16. The case of claim 15 in which said bezel component in a second available position of relative travel enables access to a recess in said body component.

17. The case of claim 16 in which the length of said travel is between 0.15 and 0.5 times the length of the case in the direction of travel.

18. The case of claim 1 in which said case include said anticipated insert.

19. A case for holding a mobile terminal comprising:
a case body that is configured to mate to the mobile terminal and contributes to formation of two discrete compartments including:
a first compartment comprising an open housing formed in the case body to accommodate the mobile terminal, said open housing including a recess defined by a back panel and a set of perimeter walls that are formed substantially perpendicular to said back panel;
a second compartment being cooperatively enclosed by mechanically engageable features integrally formed upon said case body and by a bezel having mating features structurally compatible with those formed upon the case body in which said bezel comprises at least one visual aperture;
said bezel being mechanically attached to said case body such that said second compartment forms a latching enclosure within said case body, said latching enclosure having an open state and a closed state, the case body and said bezel being displaceable relative to one another while in a mated state, said latching enclosure furthermore having a function separate and ancillary to holding of the mobile device by said first compartment such that said latching mechanism can be momentarily unlatched so that an item may be installed in the enclosure then closed and latched so that said item is securely retained within said second compartment absent mechanical separation of said bezel from said case body.

20. The case of claim 19, wherein said latching enclosure is configured to allow said bezel to slidingly move relative to the case body.

21. The case of claim 20, wherein said latching mechanism is configured to lift said bezel into a first plane when said latching mechanism moves between said closed state and said open state, said first plane being parallel to a plane of said case body.

22. A case for a mobile terminal comprising:
at least two functionally discrete components;
at least one body component having a back section and a wall section, said wall section extending in a discontinuous direction from at least one edge of said back section, said body component being configured to at least partially surround a volume enclosing electronics of said mobile terminal, the back section defining a first compartment along a first face of the back section for receiving the mobile terminal and a second compartment along a second face of the back section; and
at least one bezel component, said bezel component having a visual port through which an anticipated insert may be viewed, said body and bezel components each including mating features such that the body and bezel components can be mutually engaged with the second compartment being defined between the second face of the back section and the bezel, the mating features being formed and the mutual engagement being performed so that a degree of spatial displacement sufficient to introduce said anticipated insert is permitted between said body component and said bezel component by permitting the bezel to slidingly travel across said body component while the body component and the bezel component are retained in a mated relationship.

* * * * *